Figure 1:
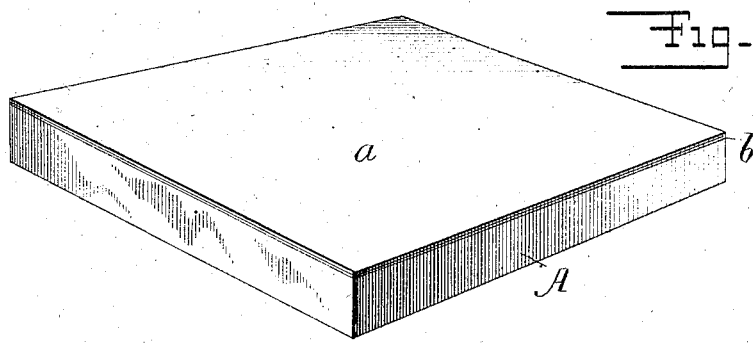

No. 748,004. PATENTED DEC. 29, 1903.
G. E. PANCOAST.
PRINTING FORM.
APPLICATION FILED JAN. 27, 1900.
NO MODEL.

WITNESSES:

INVENTOR
George E. Pancoast
BY Kenyon & Kenyon
his ATTORNEYS

No. 748,004. Patented December 29, 1903.

UNITED STATES PATENT OFFICE.

GEORGE E. PANCOAST, OF BROOKLYN, NEW YORK, ASSIGNOR TO THE AMERICAN LITHOGRAPHIC COMPANY, A CORPORATION OF NEW YORK.

PRINTING-FORM.

SPECIFICATION forming part of Letters Patent No. 748,004, dated December 29, 1903.

Application filed January 27, 1900. Serial No. 3,013. (No model.)

*To all whom it may concern:*

Be it known that I, GEORGE E. PANCOAST, a citizen of the United States, and a resident of Brooklyn, in the county of Kings, State of New York, have invented certain new and useful Improvements in Printing-Forms, of which the following is a specification.

My invention relates to printing-surfaces, and especially to lithographic or planographic printing surfaces.

The object of the present invention is to provide a printing-surface which shall be free from some of the disadvantages inherent in the lithographic or planographic printing surfaces now in general use.

Heretofore limestone of a peculiar quality has been almost exclusively used as the printing-surface in practical lithographic or planographic printing. The inception of the art consisted in the discovery of, and its development and practice are based upon, the following facts or principles: First, when an ink containing a compound consisting of a fatty acid and alkali combined, as in ordinary soap, is applied to the surface of a stone and the stone is then treated with an acid which will decompose the stone, to a slight extent, at least, the portions of the stone which were touched by the soapy substance become permanently repellent to water, or, in other words, when all grease has been removed from the surface of the stone those portions thereof so treated readily take printing-ink even in the presence of water or moisture; second, when a stone is treated with a solution of gum-arabic and an acid which will attack the stone those portions of the surface of a stone so treated acquire an affinity for water which is permanent—that is to say, while such portions of the stone will take printing-ink when dry they will retain such ink only as long as kept dry. While a temporary printing-surface may be formed upon stone without the use of a soapy ink or substance and without the treatment with gum and an acid which will decompose the stone, the proper employment of all these materials is essential to the production upon stone of a permanent printing-surface of a practical character.

The porosity of the lithographic stone is also an important characteristic thereof for the production of a permanent lithographic surface. The substances forming the ink-repellent and water-repellent portions of the printing-surface become more or less embodied in the pores of the stone or incorporated with the particles or granules forming the surface thereof, and are consequently more permanently retained on the stone. The porosity of the stone also enables it to carry sufficient water to keep its surface moist and sufficient ink to give good impressions without an excessive application of either of these substances for each printing operation.

Owing to the limited supply of stone suitable for lithographic purposes, and especially to the scarcity of perfect specimens of the larger sizes, such as are required for economical multicolor lithographic printing, and owing also to the bulk and unwieldiness of stone printing-surfaces and to their fragile character and to their limitations as to shape, many attempts have been made to find a practical substitute therefor. Substances have been heretofore rejected, however, as unfit for lithographic printing purposes unless they possess chemical properties similar to those of lithographic stone—namely, a capability of being so etched with an acid that the portions of the surface carrying a soapy substance will become permanently repellent of water and the portions of the surface untouched by the soapy ink will become permanently repellent of printing-ink in the presence of water. Porosity or grain has also been recognized as a very desirable, if not an essential, quality in a practical substitute for the stone printing-surface. These qualities in substitutes for stone printing-surfaces have been best realized in electrodeposited zinc and in pure aluminium. The zinc surface, however, possesses the disadvantage of being quickly oxidized upon exposure to the air, and it is too readily decomposed by acids. Aluminium, on the other hand, is difficult to obtain in a sufficiently pure condition and in sheets or plates having a uniform texture of the proper density to form good printing-surfaces. Both of these materials, moreover, when suitably prepared are soft, and printing-surfaces formed thereon are very sensitive and short-lived and require careful and delicate manipulation.

An object of the present invention is to provide a substitute for lithographic stone which does not have the defects above mentioned, but which is equally good, if not better, than zinc or aluminium in other respects.

To this end my invention consists in the discovery that when a comparatively hard and tough metal, such as copper or nickel or silver, is produced under proper conditions a surface having a fine, and yet an open or porous, grain is formed, which can be developed into a planographic-printing surface of a very fine quality. I have found that a surface having the required grain or porosity may be produced by the electrodeposition of any such metal if a sufficiently heavy deposit of the metal can be obtained. The weight of the deposit is not the only controlling element in obtaining the required grain, however, as the nature of the surface produced is largely affected by the character of the bath and also by its manipulation. The work of obtaining the required weight or thickness of deposit varies greatly, moreover, with the various metals and with different baths of the same metal, as will hereinafter more clearly appear. Not only may the ingredients of the plating-bath for any particular metal be varied, but the strength of the current used and the period of its application may also be greatly varied, it only being important to note that in general the more rapid the deposit is made the more even and uniform it will be. It is to be observed that a very thin deposit of any metal, such as may be determined by the color of the deposit, will be insufficient to form a printing-surface. To secure the essentials of grain or porosity or "depth" of the surface, the deposit must have a substantial thickness, which, having been experimentally determined, may thereafter be accurately reproduced by always maintaining the same condition and character of treatment in the plating-bath. I have found, moreover, that the metal forming the surface does not need to have chemical properties similar to those of the lithographic stone and that it is not necessary to employ in the etching solution used to develop the printing-surface an acid which will attack or decompose the material forming the surface.

In the accompanying drawings are illustrated two forms of printing-surfaces embodying my invention.

Figure 2:
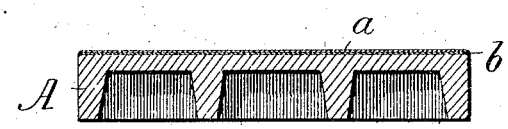
Figure 3:
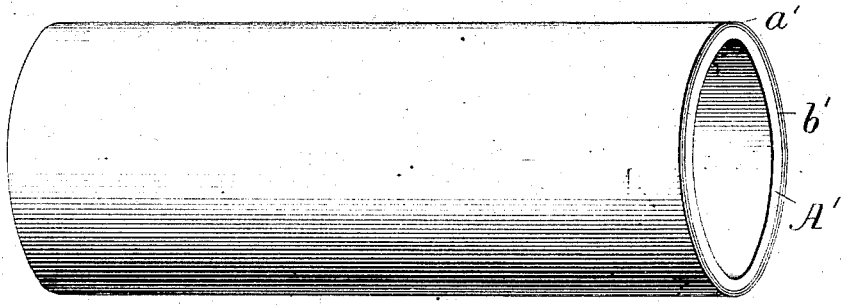
Figure 4:
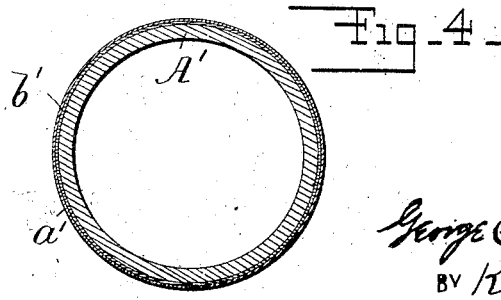

Figure 1 is a perspective view of a flat printing-form provided with a surface made in accordance with my invention. Fig. 2 is a transverse section of the same. Figs. 3 and 4 are similar views of a cylindrical printing-form embodying my invention.

Whichever of the above-mentioned or similar metals is employed as the material of my printing-surface it is preferably deposited in the form of a layer or coating upon a base or a basic layer of a different material and preferably a material of a different color and having different chemical properties from that of the coating in order that the coating may be readily removed without removing any substantial part of the material of the base, the object in this being to renew the printing-surface upon the base for each new design and also when the printing-surfaces are to be used for multicolor-printing to produce successive printing-surfaces of predetermined sizes, the characteristic of each of which as to size being determined by that of the base, all as more fully set forth in the patent to Hett, No. 637,560, dated November 21, 1899. The surface may be removed from the base in any suitable way—to wit, by mechanical or chemical means; mechanical, by stripping, cutting, abrading; chemical, by dissolving with a suitable agent or by electrolysis.

Referring to the drawings in detail, A represents a flat base, which may be recessed, as shown, to make it as light as is compatible with substantial rigidity under the pressure of printing.

$a$ represents a coating having the characteristics of my printing-surface. When it is desired to remove the coating by an acid which would attack the material of the base or when the desired grain cannot be obtained except by a bath which would attack the material of the base, the latter is provided with a protecting layer or primary coating $b$ of material which is not attacked by such acid or bath. When the printing-surfaces are used for multicolor-printing, they are preferably curved and circumferentially continuous and tubular and thin or shell-like, as shown in Figs. 3 and 4, in which A' represents a thin tubular cylindrical base, and $a'$ a circumferentially continuous coating thereon. The base A' is preferably made of steel, as this metal is cheaper and can be more easily worked and is more durable and less liable to injury than other metals. Since steel is easily corroded by chemicals, however, the base A' is provided with a protective primary coating $b'$ of any suitable material. This protective coating is preferably applied by electrodeposition; but to accomplish this care should be taken to use a plating-bath which will not attack the material of the base. I have found the following bath to be suitable, to wit:

Solution A: Dissolve in three hundred pounds of warm water ten pounds eight ounces of sodium-carbonate crystals, add gradually eight pounds twelve ounces sodium-bisulfate crystals, then add with vigorous stirring eight pounds twelve ounces of neutral acetate of copper in small portions.

Solution B: Dissolve ten pounds ten ounces of potassium cyanid in one hundred pounds of cold water.

When solution A is cold, add solution B and filter. The deposit from this bath might be used as a printing-surface. Since it is difficult, however, to obtain the desired grain with this bath, I preferably employ it to form a protective coating only on the base. This is accomplished by applying an electric current of about .1 ampere per square inch of the portion of the base receiving the deposit for half an hour, more or less.

When it is desired to form a printing-surface of copper, I prefer to employ a second plating-bath as follows, to wit: four hundred pounds water; sixty-two pounds sulfate of copper, 12° hydrometer test; sixteen pounds sulfuric acid, 15° hydrometer test. With this bath a current of .1 ampere per square inch of the portion of the base receiving the deposit applied for three hours will produce a secondary coating of copper having a good grain. The strength of current and the period of the application thereof may be varied between wide limits, however, without departing from the principle of my invention as above explained.

When the printing-surface is to be formed of nickel, any suitable base may be employed. I preferably use a steel base coated with copper in a cyanid bath, as above described, both to protect the metal of the base and to provide a basic surface of a different color and having different chemical properties from that of the coating. To obtain on the base a nickel surface having the proper grain, the following bath may be employed, to wit: In one hundred gallons of water dissolve seventy-five pounds of the double sulfate of nickel and ammonia. With this bath heated to a temperature of about 170° Fahrenheit a current of .015 to .02 ampere per square inch of the surface receiving the deposit applied for a period of four hours will give the required grain. This nickel surface is a harder and more durable surface than the copper surface, and it is not so liable to injury by oxidation or by acids.

When the printing-surface is to be formed of silver, I preferably employ a steel base protected with copper, as before described. To obtain on the base a silver surface having the proper grain, the following bath may be employed, to wit: To one thousand parts of water add 9.3 parts of chlorid of silver and then add an excess of potassium cyanid, or to one thousand parts of water add thirty-four parts of cyanid of silver, 20.5 parts of cyanid of potassium, ninety-five per cent. pure, and fifty-five parts of sodium carbonate. With either of these baths a current of .05 to .1 ampere per square inch of surface applied for a period of three or four hours will produce the required grain. Printing-surfaces may be formed of other similar metals, as gold, platinum, iron, tin, &c., it only being requisite that a sufficient quantity of the metal be deposited and the proper character of treatment in the plating-bath be maintained to form the required grained surface.

Any of these surfaces may be developed into planographic-printing surfaces by the ordinary methods of fixing the designs upon stone or zinc or aluminium surfaces. I have found, however, that the nitric acid and gum solution used in etching stone gives slightly better results. It is essential to use a soapy ink in transferring or otherwise applying the design to the surface and to employ in the etching or fixing solution an acid which will act to so fix the ink in the pores of the surface as to render the portions thereof which are touched by the ink permanently repellent of water and which will also act to so fix the gum in the pores of the surface as to render the portions thereof which are untouched by the soapy ink permanently repellent of ink in the presence of moisture.

A printing-surface produced in accordance with my invention is adapted for use as a planographic-printing surface without further treatment after it is removed from the plating-bath, washed, and dried. No chemical treatment is required to open the pores nor is any mechanical treatment, such as grinding or sand-blasting, required to give the surface its proper shape, character, grain, or finish.

Having described my invention, what I desire to claim and secure by Letters Patent is—

1. A planographic-printing surface consisting of a layer of hard metal, said layer having a substantial thickness and being formed under such conditions as to produce a tough and durable surface having a substantial depth of grain or porosity.

2. A planographic-printing surface consisting of a layer of hard metal, said layer having a substantial thickness and being formed by the deposition of the metal under such conditions as to produce a tough and durable surface having a substantial depth of grain or porosity.

3. A planographic-printing surface consisting of a layer of hard metal, said layer being formed by the electrodeposition of the metal under such conditions as to produce a tough and durable surface having a substantial depth of grain or porosity.

4. A planographic-printing surface consisting of a layer of hard metal, said layer having a substantial thickness and being formed under such conditions as to produce a tough and durable surface having a substantial depth of grain or porosity, which surface without mechanical treatment is adapted for use as a planographic surface.

5. A planographic-printing surface consisting of a layer of hard metal, said layer being formed by the electrodeposition of the metal under such conditions as to produce a tough and durable surface having a substantial depth of grain or porosity, which surface without mechanical treatment is adapted for use as a planographic surface.

6. A planographic-printing surface consisting of a layer of material which is not decomposed by the materials used in fixing a design on the surface, said layer having a substantial thickness and being formed under such conditions as to produce a surface having a substantial depth of grain or porosity.

7. A planographic-printing surface consisting of a layer of material which is not decomposed by the materials used in fixing a design on the surface, said layer having a substantial thickness and being formed by the deposition of the material under such conditions as to produce a surface having a substantial depth of grain or porosity.

8. A planographic-printing surface consisting of a layer of metal which is not decomposed by the materials used in fixing a design on the surface, said layer having a substantial thickness and being formed by the electrodeposition of the metal under such conditions as to produce a surface having a substantial depth of grain or porosity.

9. A planographic-printing surface consisting of a layer of material which is not decomposed by the materials used in fixing a design on the surface, said layer having a substantial thickness and being formed under such conditions as to produce a surface having a substantial depth of grain or porosity, which surface without mechanical treatment is adapted for use as a planographic surface.

10. A planographic-printing surface consisting of a layer of metal which is not decomposed by the materials used in fixing a design on the surface, said layer having a substantial thickness and being formed by the electrodeposition of the metal under such conditions as to produce a surface having a substantial depth of grain or porosity, which surface without mechanical treatment is adapted for use as a planographic surface.

11. A planographic-printing surface consisting of a layer of copper, said layer having a substantial thickness and being formed under such conditions as to produce a tough and durable surface having a substantial depth of grain or porosity.

12. A planographic-printing surface consisting of a layer of copper, said layer having a substantial thickness and being formed by the electrodeposition of the metal under such conditions as to produce a tough and durable surface having a substantial depth of grain or porosity.

13. A planographic-printing surface consisting of a layer of copper, said layer having a substantial thickness and being formed by the electrodeposition of the metal under such conditions as to produce a tough and durable surface having a substantial depth of grain or porosity, which surface without mechanical treatment is adapted for use as a planographic surface.

14. A planographic-printing surface consisting of a base and a coating of a hard metal, said coating having a substantial thickness and being formed under such conditions as to produce a tough and durable surface having a substantial depth of grain or porosity.

15. A planographic-printing surface consisting of a base and a coating of a hard metal, said coating having a substantial thickness and being formed by the electrodeposition of the metal under such conditions as to produce a tough and durable surface having a substantial depth of grain or porosity.

16. A planographic-printing surface consisting of a base and a coating of a hard metal, said coating having a substantial thickness and being formed by the electrodeposition of the metal under such conditions as to produce a tough and durable surface having a substantial depth of grain or porosity, which surface without mechanical treatment is adapted for use as a planographic surface.

17. A planographic-printing surface consisting of a steel base and a coating of copper, said coating having a substantial thickness and being formed by the electrodeposition of the metal under such conditions as to produce a tough and durable surface having a substantial depth of grain or porosity.

18. A planographic-printing surface consisting of a steel base and a coating of a material not decomposed by the materials used in fixing a design on the surface, said coating having a substantial thickness and being formed under such conditions as to produce a tough and durable surface having a substantial depth of grain or porosity.

19. A planographic-printing surface consisting of a base, a primary protective coating thereon, and a secondary coating of hard metal thereon, said secondary coating being formed under such conditions as to produce a tough and durable surface having a substantial depth of grain or porosity.

20. A planographic-printing surface consisting of a steel base having a primary protective coating of copper thereon and a secondary coating of hard metal thereon, said secondary coating being formed by the electrodeposition of the metal under such conditions as to produce a tough and durable surface having a substantial depth of grain or porosity.

21. A planographic-printing surface consisting of a base, a primary protective coating thereon and a secondary coating of material which is not decomposed by the materials used in fixing a design on the surface, said secondary coating being formed under such conditions as to produce a surface having a substantial depth of grain or porosity.

22. A planographic-printing surface consisting of a steel base having a primary protective coating of copper thereon and a secondary coating of copper thereon, said secondary coating being formed by the electrodeposition of the metal under such conditions as to produce a tough and durable surface having a substantial depth of grain or porosity.

23. A planographic-printing form consisting of a hard material, said material being electrolytically deposited under such conditions as to produce a tough and durable surface having a substantial depth of grain or porosity.

24. A planographic-printing form consisting of a hard material which is not decomposed by the materials used in fixing a design on the surface of the form, said material being electrolytically deposited under such conditions as to produce a tough and durable surface having a substantial depth of grain or porosity.

25. A planographic-printing form consisting of a hard material, said material being formed under such conditions as to produce a tough and durable surface having a substantial depth of grain or porosity.

In testimony whereof I have signed my name to this specification in the presence of two subscribing witnesses.

GEORGE E. PANCOAST.

Witnesses:
JOSEPH P. KNAPP,
GUSTAV H. BURK.